Figure 1:
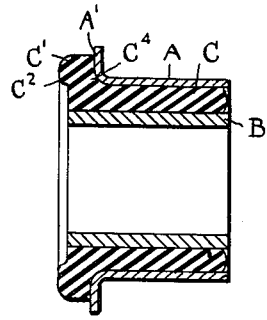

Dec. 27, 1955 P. C. HUTTON 2,728,593
FLANGED RESILIENT BEARINGS
Filed Aug. 19, 1952

Fig. 3.ᴬ

INVENTOR
PHILIP CHARLES HUTTON
BY Emery Holcombe Blair
ATTORNEYS

United States Patent Office 2,728,593
Patented Dec. 27, 1955

2,728,593

FLANGED RESILIENT BEARINGS

Philip Charles Hutton, London, England, assignor to Silentbloc Limited, London, England, a company of Great Britain Application August 19, 1952, Serial No. 305,213

Claims priority, application Great Britain April 15, 1946

9 Claims. (Cl. 287—85)

This invention relates to resilient bearings of the kind comprising an inner member in the form of a pin or sleeve and an outer member or socket surrounding the inner member with a bushing of rubber or like resilient material (hereinafter called rubber) interposed and radially compressed between the inner and outer members with corresponding elongation; and this application is a continuation-in-part of my application Serial No. 740,337, filed April 9, 1947, now Patent No. 2,608,751, dated September 2, 1952.

Such bearings are capable of accommodating a comparatively large degree of pivotal movement between the inner and outer members by intermolecular deformation of the rubber while being comparatively stiff in the radial direction, and are also capable of withstanding a limited degree of end thrust without permanent distortion or creep of the rubber. The rubber bushing is not well adapted however to withstand larger end thrusts without creeping and, in order to increase the ability of the bearing as a whole to withstand such end thrusts, it has been proposed in the specification of British Patent No. 527,780 to provide separate additional rubber bushings having outwardly directed flanges at the ends of the outer member so that the flanges lie between such ends and the inner faces of links or the like connected to the inner member whereby these flanges assist in transmitting end thrust between the inner and outer members.

The object of the present invention is to provide an improved form of bearing of the type in question which will take additional end thrust in at least one direction.

To this end a bearing of the kind referred to according to the present invention includes a resilient bushing having a body part radially compressed between the inner and outer members and an outwardly extending flange at one or each end which is uncompressed radially and substantially undistorted by the compression of the adjacent part of the bushing, this flange thus being adapted to lie between an end of the outer member and a link or other member secured to the inner member for the purpose of taking end thrust as between the outer and inner members. A flange may be provided in this way at one end only or at each end of the bushing as desired and the flange or each flange may be of about the same external diameter as that of the radially compressed body part of the bushing when in its free state, that is to say before compression. Thus, the whole bushing before assembly conveniently has about the same external diameter throughout its length and the flange or each flange is formed by a circumferential slot or groove adjacent to the end of the bushing, the diameter of the base of the slot or groove being approximately equal to that of the outer circumference of the radially compressed body part of the bushing after compression, that is to say to that of the bore of the outer member.

Thus, in making a bearing according to the present invention the inner member is conveniently inserted into the bushing after the circumferential groove or grooves have been made therein, and the bushing is then forced through a tapered guide into and partly through the outer member in the manner usually adopted in the manufacture of bushings of the kind in question. In the present case however the bushing is forced into the outer member only so far that the flange on the rear end of the bushing remains just outside the outer member while, if a flange is formed also on the forward end of the bushing, this latter flange is forced just through the outer member so that it expands on emerging therefrom. Thus the standard method of assembly for bearings of the kind in question can be employed and yet a bearing is provided in which the bushing has an integral flange at one or each end according to the invention.

In use the outer member of a bearing according to the present invention will usually be rigidly mounted in a socket into which it may be pressed with a force fit or which, especially if the bushing has flanges at both ends, may be a split socket with means for clamping its two parts together about the outer member of the bearing.

When an unsplit socket is provided it will usually be desirable to provide two bearings according to the invention disposed respectively in its two ends each with a single resilient flange at its exposed end so as to provide resilient flanges for resisting end thrust in both directions but only a single bearing may be provided where the principal end thrust to be taken is in one direction only while where desired other means may be provided for taking end thrust in the direction opposite to that in which it is taken by the single flange. For example a separate bushing constituting a flange may be provided at the end of the bearing remote from that at which the flange integral with the radially compressed body of the bushing is disposed.

Figure 2:
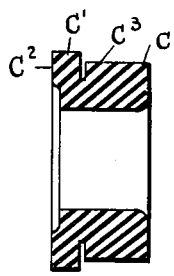
Figure 3:
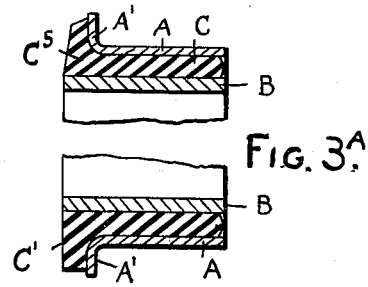
Figure 4:
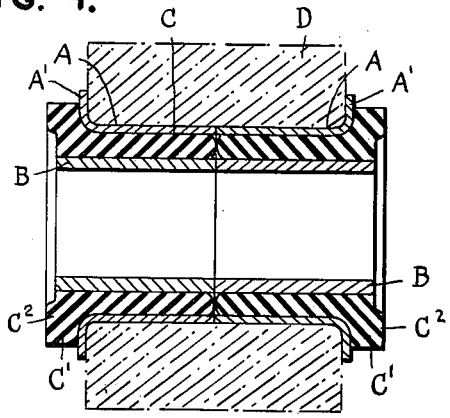
Figure 5:
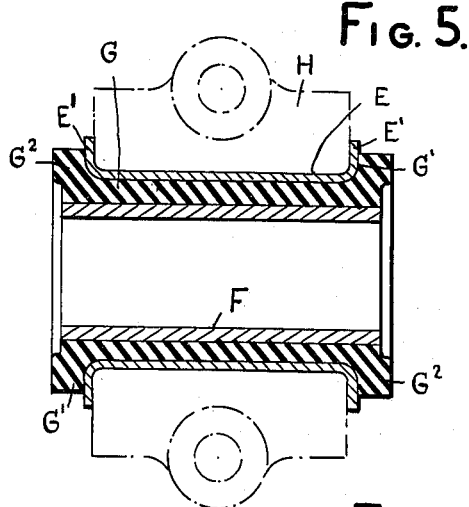
Figure 6:
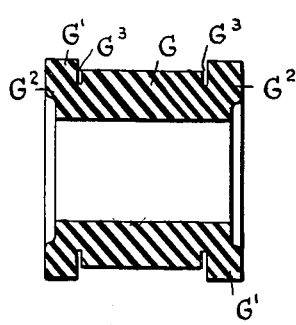
Figure 7:
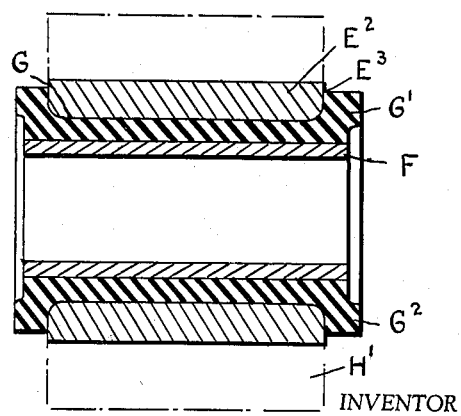
Figure 8:
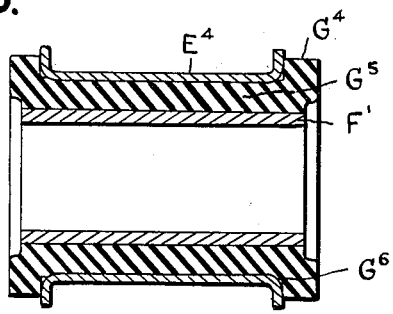

The invention may be carried into practice in various ways, but a number of constructions according to the invention are illustrated by way of example in the accompanying drawings, in which, Figure 1 is a sectional side elevation of one construction or joint according to the invention, the section being taken in a plane containing the axis of the joint, Figure 2 is a sectional side elevation of the rubber bushing used in the construction shown in Figure 1 before assembly, Figure 3 and Figure 3A are half-sectional side elevations, respectively showing two modifications according to the invention, Figure 4 is a similar view to Figure 1 showing a further modification according to the invention, Figure 5 is a similar view to Figure 1 of a still further form of joint according to the invention, Figure 6 is a similar view to Figure 2 of the rubber bushing used in the joint shown in Figure 5 before assembly, Figure 7 shows a modification of the construction shown in Figure 5, and Figure 8 is a further modification of the construction shown in Figure 5.

In the construction shown in Figure 1 the bearing comprises an outer member or socket A having an end flange $A^1$, an inner member or sleeve B and a bushing of rubber having a part C which is radially compressed and axially elongated between the members A and B and a flange $C^1$ which lies against the outer face of the flange $A^1$ and is adapted to lie and be compressed axially between the flange $A^1$ and a plate or the like rigidly connected to the member B as by being clamped to this member by a bolt passing through the member B and the plate in a customary manner as shown in my Patent No. 2,517,791, dated August 8, 1950. In the form of the rubber bushing C shown in Figure 1 the end flange $C^1$ has an annular part $C^2$ on its outer face which lies opposite the flange $A^1$ and projects axially beyond the end of the member B. This arrangement tends to insure that the flange $C^1$ will be axially compressed, in the manner referred to above, the correct degree and also that such axial compression shall be restricted approximately to the flange $C^1$ itself without imposing any corresponding axial force on the rest of the bushing C.

As will be seen from Figure 2 the part C of the bushing which after assembly lies between the members A and B, which may be termed the body section to distinguish it from the flange $C^1$, has, before assembly, a radial thickness considerably greater than that of the space between members A and B, so that, as mentioned, this body section of the bushing is radially compressed and axially elongated on assembly. Thus, the outside diameter of the body section C is greater than the inside diameter of the member A, while the inside diameter of the body section C is less than the outside diameter of the member B before assembly. The dimensions of the flange $C^1$, however, before assembly are approximately the same as after assembly. Formed at the point in the bushing where the body section C meets the flange $C^1$ is a circumferential groove $C^3$ having a depth such that the diameter of its base is approximately equal to the inside diameter of the member A. This insures that after assembly not only does the flange $C^1$ tend not to be distorted by the compression of the adjacent portion of the body section C but that there is no high degree of tension created in the rubber at the point $C^4$ in Figure 1 due to this compression.

In the modifications shown in Figure 3 the construction and arrangement is similar to that shown in Figure 1 except that instead of the flange $C^1$ with its annular projection $C^2$ the end face of the flange is inclined as shown at $C^5$ so as to be frustoconical. Similarly, in the modification shown in Figure 3A the flange $C^1$ has no projecting part $C^2$ but is flat. These two constructions may be employed for example where it is not desired that the flange shall be initially compressed axially, but that it shall be progressively compressed when relative axial movement takes place between the members A and B.

The constructions shown in Figures 3 and 3A may be assembled in the known manner by inserting the bushing C and the inner member B successively into the outer member A from the left-hand end, leaving the flange $C^1$ outside the member A.

Figure 4 shows how two bearing assemblies constructed as shown in Figure 1 may be used together where end thrust in both directions is to be resisted. Thus, in this construction the members A of the two bearing assemblies are forced from opposite ends into a bore in a member D, for example, the eye of a spring, so that the two flanges $C^1$ lie at opposite sides of the member D and are thus available to resist end thrust between the member D and side plates or the like to which the members B are secured by a bolt passing through them as shown in Figure 3 of my Patent No. 2,517,791.

Figures 5 and 6 illustrate a modification in which the rubber bushing has a flange at each end. In the construction illustrated in Figure 5 the bearing comprises an outer member or socket E having end flanges $E^1$, an inner member or sleeve F and a bushing of rubber the centre portion or body section G of which is radially compressed and axially elongated between the members E and F while its ends constitute flanges $G^1$ each having a projection $G^2$ corresponding to the projection $C^2$ in Figures 1 and 2.

As shown in Figure 6 the body section G of the bushing before assembly has considerably greater radial thickness than after assembly and circumferential grooves $G^3$ are formed at each end of the body section G where it meets the flanges $G^1$, the base of each groove having approximately the same diameter as the inner diameter of the member E.

The bearing shown in Figure 5 is conveniently assembled by first forcing the bushing into the outer member E to the point where the flange $G^1$ on the rear end of the bushing engages the face of one of the flanges $E^1$. The inner member F is then forced from the same end into the bushing G preceded by a tapered leader member in known manner so as to compress the body section of the bushing radially and elongate it axially, the dimensions of the body section of the bushing and the degree of radial compression and axial elongation being so determined that at the conclusion of this operation the flange $G^1$ on the front end of the bushing will emerge from the member E and lie against the outer face of the other flange $E^1$. The function of each of the grooves $G^3$ in this construction is the same as the function of the groove $C^3$ described above with reference to Figures 1 and 2.

Normally, in use the member E of the construction shown in Figure 5 will be rigidly clamped within a two-part housing as indicated at H since the flanges $E^1$ will not permit its being forced into a one-piece housing.

In the modification shown in Figure 7 the construction is similar to that shown in Figure 5 except that instead of the flanged outer member E, $E^1$, an unflanged outer member $E^2$ is employed having in itself sufficient radial thickness to provide end faces of adequate area against which the flanges $G^1$ lie. It will be seen that such an outer member can be passed into a bore in a one-piece housing $H^1$. Preferably the dimensions of the parts are such as to leave annular areas $E^3$ of the end faces of the member $E^2$ exposed to provide a seating for an annular ram by which the member $E^2$ can be passed into the housing $H^1$. These areas may be wholly or partially covered when the side plates are clamped to the member F by the increase in the radial dimensions of the flanges $G^1$ caused by their axial compression between such side plates and the end faces of the member $E^2$.

In the modification shown in Figure 8 the outside diameter of the inner bushing F' is the same as that shown in Figure 5 but it is shorter in length, and the length of the outer flanged bushing member $E^4$ is correspondingly shorter than the flanged outer bushing member $E^1$, so that the same shape of molded rubber bushing G may be utilized for both forms of the invention. The axial thickness of the flanges $G^4$ of the rubber bushing $G^5$ is the same as that of the flanges $G^1$. The grooves $G^6$ in the rubber bushing $G^5$, originally the same depth as the grooves $G^3$ shown in Figure 6, are less deep in the modification shown in Figure 8 but are not substantially eliminated as in Figure 5, because the amount of compression of the rubber in the form shown in Figure 8 is not as great as that in the form of the invention shown in Figure 5, wherein the outer flanged bushing member is of considerably smaller internal diameter than the external diameter of the original rubber bushing member shown in Figure 6. The depth of the grooves $G^3$ is preferably made only such as will be substantially equal to the contraction of the rubber bushing G in the region in which it is compressed between the two bushing members E and F, thus the compressed bushing will in general conform closely to the bushing G as shown in Figure 5 but the rubber will not be so greatly stressed.

I claim:

1. A resilient bearing of the type described including in combination an externally cylindrical inner member, an internally cylindrical outer member of less length than and surrounding the inner member and having an end face, and a bushing of rubber-like resilient material having a part in a state of substantial radial compression and axial elongation between the inner and outer members and an outwardly extending flange at at least one end which is uncompressed radially and has its inner face lying against the adjacent end face of the outer member, the inner face of said flange comprising one side wall of a groove formed in said bushing in its free state at the juncture of said flange with the part of said bushing which in its assembled state is radially compressed and axially elongated.

2. A bearing as claimed in claim 1 in which the rubber at the bottom of the circumferential groove after assembly is substantially of the same diameter as the inside diameter of the outer member.

3. A bearing as claimed in claim 1 in which the flange in its free state has an annular axial projection on its outer side face adjacent to its outer circumference.

4. A bearing as claimed in claim 1 in which one end of the outer member is provided with an outturned flange for co-operation with the bushing flange.

5. A resilient bearing of the type described comprising a rubber bushing with an annular body portion in a state of radial compression and axial elongation secured by frictional contact between inner and outer generally cylindrical rigid tubular bearing members and with a flange at one of its ends overlapping the adjacent end of the outer bearing member, said rubber bushing in its free state having a body section and an end section partially separated from the body section by a circumferential groove adjacent an end thereof affording a reduced portion connecting said body section and end section in the free state of said bushing, the body section of said bushing in its free state being shorter in length and larger in diameter than the inside dimensions of the outer bearing member and the bottom of the groove being approximately the same diameter as the inside of the outer bearing member, whereby when radially compressed and axially elongated between said inner and outer bearing members said bushing engages therein for substantially the full length of said radially compressed and axially elongated body portion and the outer side wall of said reduced portion thereof contacts the adjacent end of said outer bearing member and forms the part of said flange which overlaps said adjacent end of the outer bearing member.

6. A bearing as claimed in claim 5 in which the flange in its free state has an annular axial projection on its outer face adjacent to its outer circumference.

7. A bearing as claimed in claim 5 in which one end of the outer member is provided with an outward flange for co-operation with the bushing flange.

8. A bearing as claimed in claim 5 in which both ends of the bushing have grooved end sections forming flanges as described in said claim.

9. A resilient bearing of the type described comprising spaced concentric inner and outer rigid generally cylindrical members and an annular rubber-like bushing with an annular body portion disposed between said inner and outer rigid members in a state of radial compression and axial elongation and with a flange portion adjacent to one end of the body portion bearing upon said inner member and in abutting contact with the adjacent end face of said outer member, said bushing in its free state having a body section and an end section separated on the outer surface of the bushing by a circumferential groove having a depth such that the diameter of its base is approximately equal to the inside diameter of the outer rigid member, said body section and end section being connected by a neck portion of reduced cross-sectional area, the body section of the bushing in its free state being larger in cross-sectional area than the cross-sectional area between said spaced inner and outer rigid members, and said end section of the bushing in its free state being of greater cross-sectional area than the cross-sectional area between said inner and outer members, so that in the assembled bearing said end section forms the above described flange portion with the outer periphery of the neck portion disposed contiguous to the adjacent end of the outer member in the assembled bearing and protecting said flange portion from distortion by the compression of said body portion between said inner and outer members.

References Cited in the file of this patent

UNITED STATES PATENTS

| | | |
|---|---|---|
| 1,739,270 | Thiry | Dec. 10, 1929 |
| 2,104,217 | Barnes | Jan. 4, 1938 |
| 2,152,468 | De Reamer | Mar. 28, 1939 |
| 2,207,831 | Sherman | July 16, 1940 |
| 2,294,452 | Guy | Sept. 1, 1942 |